United States Patent [19]
Davey et al.

[11] Patent Number: 5,322,728
[45] Date of Patent: Jun. 21, 1994

[54] FIBERS OF POLYOLEFIN POLYMERS

[75] Inventors: Christopher R. Davey, Knoxville, Tenn.; Thomas C. Erderly, Baytown, Tex.; Aspy K. Mehta, Humble, Tex.; Charles S. Speed, Dayton, Tex.

[73] Assignee: Exxon Chemical Patents, Inc., Linden, N.J.

[21] Appl. No.: 981,029

[22] Filed: Nov. 24, 1992

[51] Int. Cl.$^5$ .................. C08F 210/06; D04H 3/16
[52] U.S. Cl. ............................ 428/296; 428/364; 428/365; 526/347; 526/348.1; 264/210.8; 57/243; 66/171; 66/202; 139/420 R
[58] Field of Search ............. 526/348.1, 348.2, 348.5, 526/348.6, 347; 428/364, 296, 365; 264/210.8, DIG. 75; 57/243; 66/171, 202; 160/330; 139/420 R

[56] References Cited

U.S. PATENT DOCUMENTS

| | | | |
|---|---|---|---|
| 4,612,300 | 9/1986 | Coleman, III, et al. | 502/113 |
| 4,644,045 | 2/1987 | Fowells | 526/348 |
| 4,830,987 | 5/1989 | Miller et al. | 437/247 |
| 4,842,922 | 6/1989 | Krupp et al. | 428/198 |
| 4,880,691 | 11/1989 | Sawyer et al. | 428/225 |
| 4,909,975 | 3/1990 | Sawyer et al. | 264/210 |
| 5,057,475 | 10/1991 | Canich et al. | 502/104 |
| 5,068,141 | 11/1991 | Kubo et al. | 428/219 |
| 5,078,935 | 1/1992 | Kobayashi et al. | 264/103 |
| 5,153,157 | 10/1992 | Hlatky et al. | 502/117 |

FOREIGN PATENT DOCUMENTS

| | | | |
|---|---|---|---|
| 0129368A1 | 12/1984 | European Pat. Off. | C08F 10/00 |
| 0277003 | 3/1988 | European Pat. Off. | C08F 4/64 |
| 0277004 | 3/1988 | European Pat. Off. | C08F 4/64 |
| 8804674 | 6/1988 | PCT Int'l Appl. | 526/336 |
| WO90/03414 | 5/1990 | PCT Int'l Appl. | C08L 23/08 |
| 2121423A | 12/1983 | United Kingdom . | |

OTHER PUBLICATIONS

Wadsworth, L. C.; Goswami, B. C.; "Nonwoven Fabrics: Spunbonded and Meltblown Processes"; pp. 6-1:-6-11; Jul. 30-Aug. 3, 1990; proceeding *Eighth Annual Nonwovens Workshop*, sponsored by TANDEC, University of Tennessee. Knoxville.

"Meltblown Process"; pp. 7-12; *Meltblown Technology Today*, Miller Freeman Publications, Inc. San Francisco, Calif.

*Primary Examiner*—Fred Teskin
*Attorney, Agent, or Firm*—Evan K. Butts

[57] ABSTRACT

Fiber with unique elastic properties comprising copolymer, of ethylene and comonomer, having density in the range of about 0.86 to about 0.93 g/cm$^3$, MWD in the range of about 2 to about 3.5, melt index in the range of about 4 to about 1000, and SDBI less than about 25° C.

15 Claims, 1 Drawing Sheet

FIBERS OF POLYOLEFIN POLYMERS

BACKGROUND FOR THE INVENTION

This invention relates to fibers, and fabrics made from them, of ethylene copolymers. Until now the use of polyethylene for formation of fiber strands and useful textiles has been limited by processing methods for the polyethylene resins available. We have made fibers and fabrics having particularly desirable characteristics. This was accomplished by manipulating the polymer formation process rather than by some of the more cumbersome means which have been attempted previously.

Historically, the free-radical initiated and Ziegler-Natta catalysis have been the available methods for olefin polymerization and preparation of high molecular weight olefin polymers and copolymers. In the 1940's the process using free-radical initiation was developed. This technique uses high pressures, high temperatures, and a free-radical initiator such as peroxides. When ethylene is polymerized in a free-radical initiation process, the polyethylene formed by such a process will generally have densities in the range of about 0.91–0.935 g/cm$^3$ and is called low density polyethylene (LDPE). Polyethylene formed by the free-radical method will generally have a high level of random branching of varying length.

In the late 1950's and early 1960's the use of "Ziegler-Natta" (Z-N) catalysts became common. These catalysts are used in a wide range of processes including low, medium, and high-pressure processes. Generally, when ethylene is polymerized using a Z-N catalyst, a "linear" product will result whose polymer molecules will be substantially unbranched. Such linear polyolefins generally have relatively high densities, in the ranges of about 0.941 to about 0.965 g/ml, which result from closer packing of the polymer molecules and minimal chain entanglement compared with the more highly branched and less dense materials. One characteristic of the polymeric species produced using the Z-N catalysts is their very broad molecular weight distribution. The same phenomenon is noted with the LDPE's.

Sawyer et al, U.S. Pat. Nos. 4,830,987, 4,880,691; 4,909,975, describe the use of an ethylene/octene (E-O) copolymer with 0.919 density in some limited fiber applications. Unfortunately, with the traditional Ziegler-Natta catalysts available at the priority date of Sawyer et al, fibers of particularly low-density polyethylene were difficult to make due to the wide MWD's inherently produced in those polymers. Kubo, et al, U.S. Pat. No. 5,068,141 report difficulties in demonstrating the teachings of Sawyer, et al.

A challenge with a polymer having a broad MWD is the likely wide variation in processing among batches. A Ziegler-Natta-type broad molecular weight distribution (MWD) material will include significant fractions of molecules which are both longer and shorter than the nominal weight. The presence of those species influence the properties of the resins.

A polymer with a large fraction of short backbone chains will be very free-flowing at relatively low temperatures; but that same fraction will cause the polymer, or its products to feel sticky or tacky, have an unpleasant odor or taste, smoke during processing, and have particularly low tensile strength. The fibers may be very difficult to process due to continuous "slubbing" or breakage during attempted fiber formation. Some slubbing appears to result from formation of low-molecular-weight polymer globules on the surface of the die face or fiber as it is formed through the die. These globules may break away from the face of the fiber-forming member or impinge upon the surface of the fiber causing a break or other imperfection.

Other difficulties arise with high-molecular-weight species. A polyolefin resin having a large fraction of very long-chain polymer species for a particular nominal molecular weight will form fibers well but they will be brittle or feel particularly coarse due to a high degree of crystallinity within the polymer itself.

Kubo, et al describe, in U.S. Pat. No. 5,068,141, formation of non-woven fabrics comprising filaments formed of linear low-density polymer of ethylene and octene. They note that the range of comonomer incorporation within the polymer used to form the fabric is limited due to rigidity at low percentages of incorporation and difficulty in forming a fine filament at high percentages of comonomer incorporation. They also note that the useful range of densities of the polymers which are suitable for this application are constrained due to poor tenacity of filaments obtained at densities in which the current invention allows production of fine fibers which have acceptable tenacity and are soft and pleasing to the touch.

Fowells, U.S. Pat. No. 4,644,045, uses a polymer melt at low-temperature polymer melt for fiber spinning or drawing, to overcome processing problems in slubbing and breaking by adjusting the spinning or fabric-formation processing conditions. Kubo, et al report that this technique leads to poor drawing, which in turn leads to frequent filament breaks caused by the high tensions necessary in this low-temperature operation.

Krupp et al, U.S. Pat. No. 4,842,922, describe spunbonded fabric prepared from a blend of linear polyethylenes at high rates of production. Krupp has recognized the inherent difficulty in forming fibers and subsequent non-woven fabrics from high-molecular-weight polyethylene. The solution proposed by Krupp et al is to blend a high-molecular-weight polyethylene, particularly a linear low-density polyethylene, with low-molecular-weight polyethylene. Again, this is a cumbersome multi-step process designed to overcome processing limitations.

Coleman, U.S. Pat. No. 4,612,300, describes a polymerization catalyst which, given the then-known art of olefin catalysis, would produce a polymer with a somewhat narrowed molecular weight distribution. However, the polymer resulting here would be of relatively high density. Such material would be useful for the process of fiber formation due to high crystallinity and high melt strength but such fibers would be stiff or rigid and would yield a "boardy" fabric since actual deformation of the crystal structure must occur to provide "give" to the fabric or garment.

Kobayashi et al, U.S. Pat. No. 5,078,935, describe the production of spunbonded non-woven fabric of continuous polypropylene fibers with acceptable "hand" or tolerable feel to the touch. Unfortunately, the hand derives from an additional mechanical creping step which makes a longer fiber temporarily act as if it were shorter. Creping in this manner yields fabric from which a close-fitting garment having some "give", may be made.

Given the difficulties encountered by others and the cumbersome approaches attempted, it is apparent that it would be useful to develop polymer fibers which are soft and yielding to body movement without having to labor with the low spinning speeds required by low melt temperatures, with blending of polymers prior to spinning, or with mechanical deformation of fibers or the resulting fabric to gain a final fabric which is tolerable to the wearer. Ideally, it would be useful to form fibers which do not require such extra processing steps but yet still provide soft, comfortable fabrics which are not tacky. Our approach to solving these problems has been to use copolymers having distinctly different characteristics to produce fibers and fabrics. This strategy avoids the cumbersome processing steps described by the prior art.

A process in which the resin-maker effectively produces the "softness" of the fiber and fabric offers tremendous advantage to the fiber-maker. This moves the costly extra processing steps, such as creping or blending, out of the fiber and fabric-maker's process. This invention has done just that. Producers of fibers can simply purchase polyolefinic resins having high-value characteristics built in. Easy production of desirable fibers and fabrics with such advantages obviates the need for the less satisfactory use of cumbersome extra processing such as resin blending, post-processing creping, or slow spinning.

Until now it has been difficult to make fibers of LLDPE of the lower densities, particularly below about 0.91. These low-density polymers historically have been essentially, gooey, sticky, and formless. Attempting to draw fibers or filaments from such material would have been difficult at best. Attempts to draw fibers or filaments from such material would have led to formation of stringy strands with little tensile strength which would slub continuously or break easily and uncontrollably during formation. Any strands or fibers obtained would continue to flow, thus losing shape during further processing or use. Additionally, the processing of traditionally catalyzed polymers having low MW fractions is difficult due to "smoking" caused by volatilization of those low MW materials.

Through the practice of our invention, which makes fibers and fabrics from polymers produced by single-site catalysis, it is now possible to make fibers and fabrics with high-value characteristics where it was previously impossible. Successful fiber formation from these high molecular weight yet very low-density polyethylenes, derives from a combination of narrow molecular weight distribution and proper distribution of comonomer and ethylene throughout the backbone chain of the polymer used. This combination of properties, which derives from the formation of polymers through the use of single-site metallocene-type catalysts, allows the production of these unique fibers. Use of these distinctive fibers in textile applications provides finished textiles which are soft, "stretchy" or have a high elastic recoverability (very low permanent set), breathable, and particularly pleasant to the touch. When these textiles are used in a finished garment, they are comfortable to the wearer over long periods of time, soft and pleasant about the body, and extremely tolerant of body movement and non-restrictive in the areas of joints or other high flexion areas of the body.

With the advent and rapid recent development of single-site catalyst systems, such as those described by Welborn, EP A 129 368, Turner and Hlatky, EP A 277 003, EP A 277 004, and U.S. Pat. Nos. 5,153,157, and Canich, 5,057,475, and Canich, Hlatky, and Turner, WO 92/00333, the teachings of all of which are hereby incorporated by reference, it has become possible to more precisely tailor the molecular weight distribution of olefinic polymers as they are made. This means that remarkably narrow MWD can be obtained in materials where, only broad MWD materials existed a few years ago. LLDPE's having such a narrow MWD, yet of generally high molecular weight polymer, effectively provide polymer which does not have the low MWD fraction which causes difficulty in strand formation. These narrow MWD products have a generally higher level of crystallinity since they lack the low MW fraction. Furthermore, they are not highly crystalline materials and so are not brittle or stiff.

The result is a polymer with the remarkable ability to form new, flexible, elastic fibers from which fabrics may be easily formed. Since fibers may be formed by traditional melt spinning, spunbonding, and melt blowing, as well as extrusion, and other methods known in the art, it is now possible to form fabrics which may be stretched, draped, and worn with comfort. Such fabrics formed of these filaments, fibers, or strands have a very pleasant hand, are quite breathable, and are surprisingly lightweight. This makes garments of such fabrics quite comfortable to wear since they stretch where needed with little effort and return to their original shape immediately. Since the hand, or feel, of the fabrics is so pleasing, such garments are marvelously comfortable for the wearer. For exemplary purposes only, those garments may include diapers, particularly liners and side shields, medical gowns, as well as other single-use or disposable items. Other examples include elastic bandages, protective garments, athletic apparel including wrist and head bands, or wicking under layers, and other applications including medical drapes where elasticity and comfort are required.

Aside from creating the highly desirable characteristic of being able to tailor the molecular weight distribution of the final molecules of the polymer resin, these new metallocene-type catalysts have the desirable characteristic of being able to easily incorporate comonomers of varying size at high levels within the backbone of the polymer produced during the polymerization process. Also, as described in the previously mentioned art, these catalysts may be advantageously employed in several different polymerization processes including, for example, high pressure, medium pressure, low pressure, solution phase, bulk phase, slurry phase, and gas phase polymerization.

Molecular weight distribution (MWD) of the polymer is reported as a ratio of $M_w/M_n$. This is the weight average molecular weight divided by the number average molecular weight. MWD's in the range of about 1.8–3.5 are useful in the practice of this invention. The upper range of the apparently useful molecular weight distribution is in the area of about 3.5 but 3 or below is preferred as the upper side of the range.

The ability to incorporate comonomers at high levels within the polymer chain while still maintaining control over the narrow molecular weight distribution of the polymer appears to be unique to the single-site, particularly to the metallocene-type, catalysts. The advantageous characteristics of these new catalyst systems or catalytic compounds now makes it possible to obtain polyolefinic resins useful for forming strands or fibers, followed by incorporation of those fibers or strands into fabrics that are soft rather than "boardy", drapeable, pleasant to touch and wear, breathable, and elastic where needed, with no unpleasant odor or tackiness caused by the presence of the shorter-chain polymeric species. Additionally, these single-site catalyst-produced resins eliminate the smoking, caused by volatilization of the low MW species during processing, by not including those low MW species.

In an effort to determine a reasonable and accurate method by which distribution of comonomers throughout the polymer chain can be characterized, a new test which provides a "Solubility Distribution Breadth Index" (SDBI) has been developed. An overview of the SDBI measurement includes recognition that this is a similar measurement to the previously published "Composition Distribution Breadth Index" (CDBI), as described in WO 90/03414 which was published 5 Apr., 1990.

In general, this test provides for measurement of the solubility of a polymer resin sample at varying temperatures in a specific solvent. The net effect is that the more highly branched species within a polymer sample will be generally more soluble in solvent at the lower temperatures. As the temperature of the sample and solvent is increased, the less branched species begin to solvate. This allows for a detector, which is downstream from the elution column, to measure the amount of solvated polymer which elutes at various temperatures. From the measured solubility distribution curve, one can calculate the average dissolution temperature. One can also calculate a quantity called the solubility distribution breadth index (SDBI), which is a measure of the width of the solubility distribution curve. Through use of a fourth power term in its calculation, SDBI is defined in such a way that its value is very sensitive to the amount of polymer that is solubilized at temperatures far removed from the average dissolution temperature.

Solubility Distribution may be measured using a column which is 164 cm long and has a 1.8 cm ID (inner diameter) packed with non-porous glass beads (20-30 mesh) and immersed in a temperature programmable oil bath. The bath is stirred vigorously to minimize temperature gradients within the bath, and the bath temperature is measured using a platinum resistance thermometer. About 1.6 g of polymer is placed in a sample preparation chamber, which is repeatedly evacuated and filled with nitrogen to remove oxygen from the system. A metered volume of tetrachloroethylene solvent is then pumped into the sample preparation chamber, where it is stirred and heated under 3 atmospheres pressure at 140° C. to obtain a polymer solution of about 1 percent concentration. A metered volume of this solution, 100 ml, is then pumped into the packed column thermostated at about 120° C.

The polymer solution in the column is subsequently crystallized by cooling the column to 0° C. at a cooling rate of about 20° C./min. The column temperature is then maintained at 0° C. for 25 minutes. The elution stage is then begun by pumping pure solvent, preheated to the temperature of the oil bath, through the column at a flow rate of 27 cc/min. Effluent from the column passes through a heated line to an IR detector which is used to measure the absorbance of the effluent stream. The absorbance of the polymer carbon-hydrogen stretching bands at about 2960 cm$^{-1}$ serves as a continuous measure of the relative weight percent concentration of polymer in the effluent. After passing through the infrared detector the temperature of the effluent is reduced to about 110° C., and the pressure is reduced to atmospheric pressure before passing the effluent stream into an automatic fraction collector. Fractions are collected in 3° C. intervals. In the elution stage pure tetrachloroethylene solvent is pumped through the column at 0° C. at 27 cc/min for 25 min. This flushes polymer that has not crystallized during the cooling stage out of the column so that the percent of uncrystallized polymer (i.e., the percent of polymer soluble at 0° C.) can be determined from the infrared trace. The temperature is then programmed upward at a rate of 1.0° C./min. to 120° C. A solubility distribution curve, i.e., a plot of weight fraction of polymer solvated as a function of temperature, is thus obtained.

The procedure for calculating the Solubility Distribution Breadth Index (SDBI) is set forth below.

Solubility distributions of two ethylene copolymers are shown in FIG. 1. Here, for illustration purposes only, Sample X has a narrow solubility distribution and elutes over a narrow temperature range compared to Sample Y, which has a broad solubility distribution. A Solubility Distribution Breadth Index (SDBI) is used as a measure of the breadth of the solubility distribution curve. Let w(T) be the weight fraction of polymer eluting (dissolving) at temperature T. The average dissolution temperature, $T_{ave}$, is given by:

$$T_{ave} = \int T w(T) dT, \text{ where } \int w(T) dT = 1$$

SDBI is calculated using the relation:

$$SDBI (°C.) = \sqrt[4]{(T - T_{ave})^4 w(T) dt}$$

(SDBI is thus analogous to the standard deviation of the solubility distribution curve, but it involves the fourth power rather than the second power to $T - T_{ave}$). Thus, for example, the narrow solubility distribution Sample X (single-site catalyst (SSC) produced) and the broad solubility distribution Sample Y (multi-site catalyst (multi) produced) in FIG. 1 have SDBI values equal to 14.6° and 29.4° C., respectively.

The preferred values of SDBI for fibers and fabric of this invention are less than 25° C. and more preferred at less than 20° C.

For the purpose of describing this invention the term "fiber" is intended to comprehend at least the litany of related terms as described by Sawyer, et al. including fiber, monofilament, multi-filament, staple, and strand, without regard to method of formation of any of these. We consider, for example, that the term "strand" will at least encompass a fiber which may be formed by normal means as well as those which may be, for example, slit or cut from a sheet or band.

The term "comonomer", for the purpose of description of this invention, is intended to comprehend at least: ethylenically unsaturated olefins or olefinic species, cyclic olefins, ethylenically unsaturated non-cyclic non-conjugated polyenes, cyclic non-conjugated polyenes, acetylenically unsaturated monomers, or combinations thereof.

SUMMARY ethylene and

Novel fibers, of copolymer of ethylene and comonomer having density in the range of about 0.86 to about 0.93 g/cm³ with about 0.91 g/cm³ being the preferred upper limit, MWD in the range of about 2 to about 3.5 with about 3 being preferred as the upper limit, melt index in the range of about 4 to about 1000, and SDBI less than about 25° C., along with fabrics incorporating these fibers, have been developed. These fibers and fabrics have the unique properties of being soft, elastically recoverable with permanent set being somewhat variable with density but, preferably of between about 5 and about 30%, non-tacky, non-boardy, breathable, and comfortable to the wearer. These properties are achievable in the fibers through tailoring of the polymer from which they are formed rather than by cumbersome blending, post-formation mechanical deformation, or other difficult or expensive processing. These fibers may be produced by any method which draws fiber from a reservoir of molten polymer including melt-spinning, melt-blown, and spunbonding processes. They may also be produced in less traditional methods including sheet-slitting or stuff-crimping as well as other methods available in the art.

DETAILED DESCRIPTION

Figure 1:
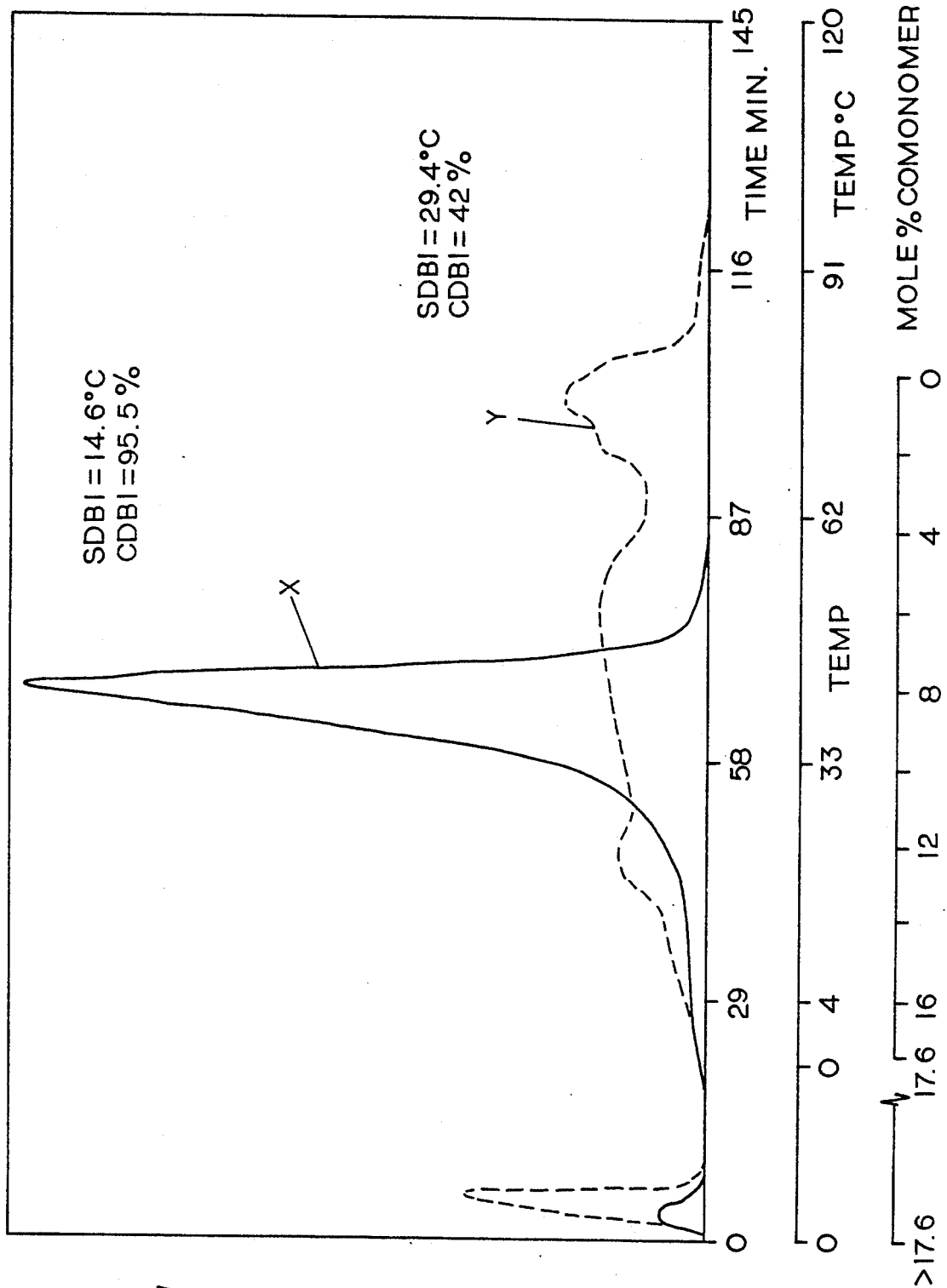
FIG. 1 graphically depicts solubility distributions of two ethylene copolymers.

One aspect of this invention is directed toward fiber and the formation of fiber comprising; copolymer of ethylene and comonomer, that copolymer having density in the range of about 0.86 to about 0.93 g/cm$^3$ with less than about 0.92 or about 0.91 g/cm$^3$ preferred as the upper side of the range, MWD in the range of about 2 to about 3.5 with about 3 being preferred for the upper side of the range, melt index in the range of about 4 to about 1000, and SDBI less than about 25° C.

Another aspect of this invention is directed toward a method of making such fiber comprising drawing fiber from a reservoir of molten copolymer.

A further aspect of this invention involves fiber formation by passing molten copolymer through at least one forming device and concurrently or subsequently solidifying copolymer. Such a method might include, for example, traditional melt spinning and fiber formation in a spunbonding process.

Another aspect of this invention involves fiber formation by movement of a fluid, different from copolymer, around molten copolymer. This method would include, for example, fiber formation in the early stages of melt-blown fabric formation.

Another important aspect of this invention includes formation of fabric from fiber produced in the manner described.

According to the present invention there is provided a fiber comprising a copolymer of ethylene and one or more comonomer, which copolymer has a density of from about 0.86 to about 0.93 g/cm$^3$, a molecular weight distribution of from about 2 to about 3.5, a melt index (MI, ASTM D-1238 (E)) of from about 4 to about 1000, and an SDBI of less than about 25° C.

Each comonomer preferably has from 3 to 20, more preferably 3 to 10 carbon atoms and may comprise for example propylene, butene-1, hexene-1, octene-1, 4-methyl-1-pentene, styrene, or combinations thereof.

In general, the narrower the MWD the better for fiber production, so the preferred MWD range is from about 2 to about 3. SDBI is a measure of the distribution of comonomer units along the copolymer chain. In general, the more uniform the distribution, i.e., the narrower the compositional distribution about the mean, the better. Accordingly for the fiber, the SDBI is less than about 25° C., preferably less than about 20° C.

The nature and proportion of comonomer in the copolymer controls the density, and preferably comonomer-type and content are adjusted to yield densities of from about 0.86 to about 0.93, more preferably 0.86 to about 0.92, 0.915, 0.910 or 0.90, and most preferably to about 0.89. Such densities, in conjunction with the required copolymer characteristics of MWD, MI, and SDBI have been found to yield fibers having optimized features of production and use.

The preferred MI of the copolymer depends on the manner in which fiber is to be formed. For production by the spunbond process, the preferred range is from 4–60; for the meltblown process, it is from 10 to 1000.

The preferred use of the inventive fibers, is in the formation of fabric, especially non-woven fabrics. Fabrics formed from the fibers have been found to have excellent elastic properties making them suitable for many garment applications. They also have good drapeability.

Some of the desirable properties of fibers and fabric may be expressed in terms of tensile modulus and permanent set. For a spunbonded fabric according to the invention, the preferred properties which are obtained are as follows:

Tensile modulus (g) (ASTM-1682) (100% extension, 6 cycles, machine direction (MD)): preferably less than 900, more preferably less than 800, most preferably from 100 to 400; and/or Tensile modulus (g) (50% extension, 6 cycles, MD): preferably less than 700, more preferably less than 600, most preferably from 100 to 300; and/or Tensile modulus (g) (100% extension, 6 cycles, transverse direction (TD)): preferably less than 600, more preferably less than 500, most preferably from 50 to 300; and/or Tensile modulus (g) (50% extension, 6 cycles, TD): preferably less than 370, more preferably from 40 to 200; and/or Permanent set (%) (obtained through use of a modification of ASTM D-1682 wherein the stretching is cycled rather than continued through fabric failure) (50% extension, 6 cycles, MD): preferably less than 30, more preferably in the range of about 5–about 25%, most preferably less than 10-20; and/or Permanent set (%) (50% extension, 6 cycles, TD): preferably less than 35%, more preferably in the range of about 5–about 25%; and/or Permanent set (%) (100% extension, 6 cycles, MD): preferably less than 40%, more preferably in the range of about 5–about 35%, most preferably 8-20%; and/or Permanent set (%) (100% extension, 6 cycles, TD): preferably less than 40%, more preferably in the range of about 5–about 35%, most preferably in the range of about 5 –25%; and/or Bond Temperature (°C) less than 110, more preferably in the range of about 35–about 105, most preferably from 40-80. These properties are preferred and have utility for all fabrics of the invention, and are demonstrated, for example, by a fabric made from fibers according to the invention and having a basis weight of about 70 to about 80 g/m$^2$, preferably about 70 g/m$^2$ and formed from fibers having diameter of about 25-28 μm.

For meltblown fabric, according to the invention, the preferred properties follow:

Permanent set (%) (50% extension, 6 cycles, MD): preferably less than 25, more preferably in the range of about 10–about 20, most preferably 15–18; and/or Permanent set (%) (50% extension, 6 cycles, TD): preferably less than about 25, more preferably in the range of about 10–about 20, most preferably 15–18; and/or Tensile modulus (g) (50% extension, 6 cycles, MD): preferably not more than about 300, more preferably in the range of about 200–about 300; and/or Tensile modulus (g) (50% extension, 6 cycles, TD): preferably less than about 300, more preferably in the range of about 50–about 150; about 150; and/or Total Hand (g): preferably less than about 75, more preferably less than about 70, most preferably in the range of about 10–about 20.

These properties are preferred and have utility for all fabrics of the invention, and are demonstrated, for example, by meltblown fabric with nominal basis weight of about 70g/m$^2$, according to the invention, made from fibers according to the invention of 8–10 μm diameter.

Recent advances, in the art of olefin polymerization using single-site catalysis have made it possible to produce the polymers as previously described. From polymers made by use of those single-site catalysts we have generated the unique fibers which are described here and which yield remarkable and beneficial effects in the fabrics created from those fibers. For the purposes of this invention metallocene catalysts include not only bis-cyclopentadienyl transition metal compounds but also monocyclopentadienyl/heteroatom transition metal compounds and other similarly catalytic transition metal compounds, in combination with an activating cocatalyst. These may include organo-metallic cocatalysts, particularly organo-aluminum compounds in the form of alumoxanes, or bulky anionic catalyst activators as disclosed in EP A 277 003 and EP A 277 004.

Through the use of these catalyst system and comonomers it is possible to create polymer resins which are useful in the practice of this invention ranging in density from about 0.86 to about 0.93. Within this range these catalyst systems will also yield resins having tailored narrow molecular weight distributions which are centered around any of several desirable molecular weights.

Currently the best path to producing fibers or strands of this invention is to draw them from a molten reservoir of the proper copolymer as previously described. These copolymers may be produced by polymerizing the proper combinations of monomers with single site catalyst systems. Particularly useful catalyst systems include the metallocene/and monocyclopentadienyl-heteroatom-transition metal/activator systems, as described in EP A 129 368, EP A 277 003, EP A 277 004, U.S. Pat. Nos. 5,153,157, 5,057,475, and WO 92/00333. As it is now known in the art, suitable activators for these families of catalytic transition-metal compounds include various alumoxanes, particularly trimethyl alumoxane, and bulky labile anionic activators.

EXAMPLES

Several samples of copolymers were used to form fibers. The copolymers ranged in densities from about 0.86 g/cm$^3$ through about 0.93 g/cm$^2$. Fibers of polymers produced by these single-site catalysts or metallocene-type catalyst produced polymers demonstrated surprising and unique effects in several ways. First, it is remarkable that these low-density materials could be spun into fiber at all. When compared with copolymers produced by traditional catalysts one would have expected that these copolymers, if they would spin at all, would have formed sticky, gooey fibers which would have adhered to each other in a useless and shapeless mass. Surprisingly, however, these resins spun into fibers well and actually demonstrated qualitatively easier fiber formation.

Second, fabric made from the resultant fibers had an unusually soft texture and displayed none of the expected "tack" or stickiness. Such low-density polymers produced by traditional-type catalysts, as described by Sawyer, et al, if successfully spun into fibers would have been quite unmanageable.

Probably the most surprising effect noted with these fibers, and fabrics made from them, is their remarkable elastic behavior and drapeability. Compared to the higher density polyethylenes, these fabrics display little of the tensile or permanent set which one would expect but rather displayed remarkable elastic recovery, or low permanent set, after exposure to tensile stress.

Additionally, it has been discovered that these materials lack the low molecular weight species which are necessarily produced by the more traditional catalysts. Therefore, they lack the short-chain or low molecular weight species which would be expected to interfere with the surface characteristics of the fiber. Without the low MW species, none can exude to the surface of the fiber in the form of the sticky material which would be characteristic of the traditional-catalyst-produced materials. A further advantage, which may explain the qualitative observations of ease of spinning, as described later, is that these single-site catalyst produced materials, which do indeed lack the low molecular weight (short-chain length) species would not have problems with the detrimental shorter-chain species collecting around the spinnerette holes during spinning.

In normal processing, these species would tend to collect to a point and finally break off causing an irregularity in the spun fiber, and perhaps a break or a slub which would lead to a spinning line shut down. Single-site catalyst-produced copolymers employed to form the inventive fibers (Examples 1–4 and 6–8) spun freely without slubbing at high rates of spinning for long periods of time. This contrasts with the results noted with the traditionally catalyzed material which was used for comparative examples 5 and 6. The comparative materials exhibited frequent slubs during processing which necessitated line shutdown several times during the test spinning.

A property related to softness of the fabric is "drapeability". This characteristic is measured in a qualitative fashion. Generally, a piece of fabric is placed or "draped" over an object having complex contours including, for example, the human hand or fist. A fabric with low drapeability would display many "creases" or "hard" wrinkles which hide the contours of the underlying object. A highly drapeable fabric would display few such wrinkles but rather would generally conform more closely to the contours of the underlying object. Although a qualitative measure, it is a concept and test which is understood by those familiar with the textile arts. Without exception, the single-site catalyst produced resins displayed a high degree of drapeability. Fabrics made from the comparative test resins in each set of tests were not highly drapeable. To the wearer, a drapeable fabric will feel soft while a less drapeable fabric will feel "boardy" or stiff and irritating to the wearer.

Another notable and beneficial effect exhibited by the single-site catalyst produced copolymers is the noticeably lower bonding temperatures which were required when forming spun fibers into non-woven fabric. This means that it would be possible to operate bonding equipment, such as for example, a calendaring roll, at lower temperatures. Such lower temperature operation would provide energy savings for the producers of non-woven fabrics.

Ethylene/butene (EB) (Examples 1-3 and 6-8) and ethylene/propylene (EP) (Example 4) copolymers were tested within the density range previously mentioned in a spunbonding process. For comparative information these were tested against ethylene-octene (EO) copolymer material which is believed to have been produced in a process using a traditional multi-site catalyst (Examples 5 an 9). The comparative material which was produced by traditional catalysis was Dowlex 2517, a 25 melt index, 0.917 g/cm³ material which is similar to Dow Aspun 6801, both available from Dow Chemical Company, Midland, Mich. The single-site catalyst produced materials used in these tests were received from Exxon Chemical Company.

The first test run was to form fibers and create a spunbonded non-woven fabric. This was accomplished by use of a one meter Reicofil line which is made by Reifenhauser Company. The extruder size was 7 cm (2.75 in.) with a 30:1 length:diameter ratio. There were 3719 die plate holes, each having a diameter of 0.4 mm with L/D=4/1. Table I provides general information on the polymers which were tested, processing conditions for each polymer tested, and test results of the non-woven spunbond fabric which was produced. The spunbonding process is one which is well known in the art of fabric production. Generally, continuous fibers are extruded, laid on an endless belt, and then bonded to each other, often by a heated calendar roll. An overview of spunbonding may be obtained from Wadsworth, L. C. and Goswami, B. C., Nonwoven Fabrics: "Spunbonded and Meltblown Processes", proceeding *Eighth Annual Nonwovens Workshop*, Jul. 30–Aug. 3, 1990, sponsored by TANDEC, University of Tennessee, Knoxville.

TABLE I

SPUNBOND TRIAL RESULTS

| EXAMPLE | 1 | | 2 | | 3 | | 4 | | (Comparative) 5 | |
| --- | --- | --- | --- | --- | --- | --- | --- | --- | --- | --- |
| COMONOMER | EB | | EB | | EB | | EP | | EO | |
| MI (Dg/min) | 31 | | 31 | | 9 | | 20 | | 26 | |
| DENSITY (g/cm²) | 0.921 | | 0.888 | | 0.867 | | 0.863 | | 0.917 | |
| DSC $T_m$ (°C.) | 107.7 | | 73.3 | | 55.2 | | 52 | | 124.1 | |
| GPC $M_w$ (K) | 45.5 | | 45.2 | | 61.0 | | 47.8 | | 46.2 | |
| GPC $M_n$ (K) | 21.4 | | 21.7 | | 31.4 | | 21.8 | | 10.4 | |
| GPC $M_w/M_n$ | 2.1 | | 2.1 | | 1.95 | | 2.2 | | 4.4 | |
| SDBI (°C.) | ≦17.0 | | ≦17.0 | | ≦17.0 | | ≦17.0 | | 26.2 | |
| CATALYST | SSC | | SSC | | SSC | | SSC | | MULTI | |
| DIRECTION | MD | TD | MD | TD | MD | TD | MD | TD | MD | TD |
| PERMANENT SET (%) | | | | | | | | | | |
| 50% EXTENSION | | | | | | | | | | |
| CYCLE 1 (%) | 17.5 | 22.4 | 12.5 | — | 6.87 | — | 10.0 | 15.8 | 22.5 | 25.8 |
| CYCLE 6 (%) | 27.9 | 32.9 | 20 | — | 11.25 | — | 18.6 | 22.5 | 32.5 | 36.7 |
| 100% EXTENSION | | | | | | | | | | |
| CYCLE 1 (%) | 31.2 | 30 | 21.4 | 22.4 | 7.0 | 9.7 | 10.6 | 15.8 | 32.5 | 35 |
| CYCLE 6 (%) | 45 | 47.5 | 31 | 32.7 | 9.3 | 13.7 | 18.75 | 25 | 43.8 | 46 |
| TENSILE MODULUS (g) | | | | | | | | | | |
| 50% EXTENSION | | | | | | | | | | |
| CYCLE 1 (g) | 621 | 417 | 340 | — | 127 | — | 159 | 64 | 812 | 395 |
| CYCLE 6 (g) | 581 | 367 | 299 | — | 109 | — | 132 | 45 | 735 | 395 |
| 100% EXTENSION | | | | | | | | | | |
| CYCLE 1 (g) | 907 | 635 | 449 | 268 | 277 | 141 | 195 | 95 | 1157 | 726 |
| CYCLE 6 (g) | 794 | 499 | 399 | 240 | 231 | 113 | 150 | 77 | 1134 | 680 |
| BASIS WEIGHT (g/m²) | 0 70 | | 0 70 | | 0 70 | | 0 80 | | 0 70 | |
| BOND TEMP (°C.) | 102 | | 0 70 | | 0 51 | | 0 40 | | 112 | |

| PROCESS PARAMETERS | | | | | |
| --- | --- | --- | --- | --- | --- |
| EXAMPLE | 1 | 2 | 3 | 4 | 5 |
| FLOW RATE (g/hole/min) | 0.35 | 0.35 | 0.35 | 0.35 | 0.35 |
| DIE MELT TEMP (°C.) | 220 | 219 | 227 | 216 | 211 |
| SPIN PUMP (rpm) | 14.9 | 15 | 15 | 15 | 15.1 |
| DIE PRESSURE (kg/cm²) | 32.2 | 36.3 | 90.0 | 56.7 | 42.3 |
| BOND PRESSURE (kg/linear cm) | 68.3 | 70.9 | 68.6 | 67.9 | 67.3 |
| EXT. SPEED (rpm) | 82.3 | 79.3 | 78.5 | 79.3 | 86.9 |
| SPIN BELT SP. (mpm) | 15 | 15.1 | 15.2 | 13.9 | 15.2 |
| CALENDAR SP. (mpm) | 14.7 | 14.8 | 14.9 | 14.8 | 15.6 |
| WIND SPEED (mpm) | 16.9 | 16.2 | 17 | 20.8 | 17.2 |
| SUCTION BLOWER SP. (rpm) | 1903 | 2115 | 1898 | 1512 | 2156 |
| COOLING AIR (°C.) | 8 | 8 | 9 | 8 | 7 |
| COOLING AIR SP. (rpm) | 1104 | 1106 | 1055 | 1050 | 1102 |

| BOND TEMP. (°C.) | 102 | 70 | 50 | 40 | 112 |

TABLE I-continued

Viewing tensile modulus, ASTM D-1682, at both 50 percent extension and 100 percent extension as being related to drapeability and softness, or ease of extension of the fibers or fabric it is apparent that the 0.921 density copolymer resin with a 31 melt index (Example 1) demonstrates noticeably diminished tensile modulus or enhanced drapeability and softness when compared with the similar comparative material (Example 5) having 0.917 density and melt index of about 26. Viewing permanent set as a measure of elastic recoverability it is apparent that Example No. 1, which shows the 0.921 density material having melt index of 31, has measurably greater elastic recoverability, or less permanent set, at 50% extension than does the comparative Example No. 5 at that same 50% extension. Viewing the 100% extension results presented for fabric Example No. 1 it is not so clearly apparent that elastic recoverability for fabric derived from the single-site catalyst produced material is remarkably better. However, noticeable benefits in softness and elastic recovery after 50 percent extension do indeed demonstrate incrementally better properties.

Permanent set was measured by hysteresis tests conducted with an Instron Model 1122 with a jaw gap of 13 cm (5 in.) and 13 cm (5 in.) crosshead speed of 13 cm/min at 50 and 100% extension through the designated number of cycles for the spunbonded material. This test is a modification of ASTM D-1682 wherein the stretching is cycled rather than continued through fabric failure; after stretching the designated amount for the designated number of cycles, loss of recoverability, or permanent set, is measured. The later described meltblown fabric was tested for two cycles. Tensile modulus is the peak force encountered during first and last cycle.

While improvement in properties does begin to show up in the range of about 0.93 density for materials derived from single-site catalyst produced polymers, it is readily apparent from Example Nos. 2, 3, and 4 that elastic recoverability, as measured by lack of permanent set, is measurably better than the comparative material (Example 5). Further, Example Nos. 2, 3, and 4 demonstrate clearly that the tensile modulus, which relates to drapeability and softness, is much improved for these examples and can be tailored in relation to densities.

A similar trend is demonstrated in the bonding temperature for the test examples versus comparative example. Example No. 1 having a density of 0.921 demonstrates a ten degree lower bonding temperature than comparative Example No. 5 which has a density of 0.917. This measurable difference in bonding temperature is even more remarkable density decreases as shown in Example Nos. 2, 3, and 4. All of those examples demonstrate bonding temperatures some 40°-70° C. lower than that of the comparative example.

Further testing was done by spinning fibers using a melt blown process with similar materials. Meltblown technology is well known in the art of fabric production. An overview of the process may be obtained from "Meltblown Process", *Meltblown Technology Today*, Miller Freeman Publications, Inc., San Francisco, Calif., 1989, pgs 7-12. Again, a traditional multi-site catalyst produced resin (Example 9) was compared with single-site catalyst produced ethylene comonomers of varying densities and melt indices (Examples 6-8). This testing was accomplished using a 51 cm (20 in.) Accurate Products Meltblown line. The extruder was a 5 cm (2 in) Davis Standard with a 30:1 length-:diameter ratio. The die nozzle had 501 die holes. The diameter of each being 0.4 mm. (0.015 in). Die length was 15:1 and the air gap was set to 0.15 mm. (0.060 in.). The comparative traditional material was Dow Aspun 61800.31 which may be obtained from Dow Chemical Company, Midland, Mich. Each of the other tested resins were single-site catalyst produced ethylene copolymers and were received from Exxon Chemical Company.

Table II describes general polymer properties, process parameters, and final fabric test results.

TABLE II

| MELTBLOWN HYSTERESIS RESULTS | | | | | | | | |
|---|---|---|---|---|---|---|---|---|
| EXAMPLE | 6 | | 7 | | 8 | | (Comparative) 9 | |
| COMONOMER | EB | | EB | | EB | | EO | |
| MI (Dg/min) | 105 | | 95 | | 31 | | 150 | |
| DENSITY (g/cm³) | 0.917 | | 0.888 | | 0.888 | | 0.931 | |
| DSC $T_m$ (°C.) | 102 | | 73.4 | | 73.3 | | 125 | |
| GPC $M_w$ (K) | 31.03 | | 31.96 | | 45.2 | | 26.8 | |
| GPC $M_n$ (K) | 11.9 | | 15 | | 21.7 | | 7.44 | |
| GPC $M_w/M_n$ | 2.61 | | 2.13 | | 2.1 | | 3.6 | |
| SDBI (°C.) | ≦17.0 | | ≦17.0 | | ≦17.0 | | 26.2 | |
| CATALYST | SSC | | SSC | | SSC | | MULTI | |
| DIRECTION | MD | TD | MD | TD | MD | TD | MD | TD |
| PERMANENT SET (%) | | | | | | | | |
| 50% EXTENSION | 22.5 | 22.5 | 16.7 | 16.7 | 15.8 | 15.8 | 30 | 28.3 |
| TENSILE MODULUS (g) | | | | | | | | |
| 50% EXTENSION | 463 | 399 | 286 | 91 | 231 | 104 | 367 | 345 |
| TOTAL HAND (g) | | 69 | | 15 | | 13 | | 84 |
| BASIS WEIGHT (g/m²) | | 70 | | 70 | | 70 | | 70 |
| SEM FIBER DIAMETER (μm) | | 8.9 | | 9.8 | | 9.1 | | 9.2 |
| PERTINENT PROCESS PARAMETERS: (MELTBLOWN) | | | | | | | | |
| EXAMPLE | 6 | | 7 | | 8 | | 9 | |
| MELT (°C.) | 420 | | 420 | | 430 | | 420 | |
| FLOW RATE (g/hole/min) | 0.4 | | 0.4 | | 0.4 | | 0.4 | |

TABLE II-continued

| | | | | |
|---|---|---|---|---|
| % AIR | 0 75 | 0 75 | 0 75 | 0 75 |
| AIR RATE (m³/min) | 9.20 | 9.20 | 9.20 | 9.20 |
| AIR TEMP (°C.) | 421 | 422 | 418 | 420 |
| DCD (cm) | 25.4 | 33 | 49.5 | 25.4 |
| PRESSURE (Kg/cm²) | 21.72 | 22.78 | 50.97 | 15.61 |

LINE = 51 cm (20 in) ACCURATE MELTBLOWN LINE
EXTRUDER = 5 cm (2 in) DAVID STANDARD, 30:1 L/D
DIE HOLES = 501
HOLE DIAMETER = 0.38 mm (0.015 in.)
DIE LENGTH = 15:1
AIR GAP = 1.5 mm (0.060 in.)

When reviewing the results presented in Table II, comparison between Example Nos. 6 and 9 demonstrates that the fabric of example 6 is measurably more elastically recoverable but by measurement of tensile modulus does not appear to be noticeably more easily extended than comparative Example No. 9. It is in this area of about 0.92-0.93 density at which the advantages of softness and elastic recoverability as well as low bonding temperature begin to appear in the practice of this invention. As with the results of the spunbonded trials, it is seen in the meltblown trial results that the characteristics which are so desirable do indeed begin to show up in this region but are more definitively and completely present within the lower density ranges as demonstrated by the fabrics made from fibers spun from the single-site catalyst produced polymer resin Example Nos. 7 and 8. In both sets of trials, elastic recoverability, or lack of permanent set, improves with decreasing density of the polymer material. Another measure of "softness" is total hand. It can easily be seen that Example No. 6 does provide fibers and fabric which are softer than those demonstrated by the comparative Example No. 9. With the exception of the outlying data points for tensile modulus for Example No. 6, it is apparent that the copolymer resins produced by single-site catalysis provide the inventive fibers and fabric with the demonstrated beneficial characteristics which are the advantages of this invention. Total hand is measured on the Thwing, Albert Handle-O-Meter, Model 211-5, according to TAPPI 4998 CM-85 test method using a 0.64 cm (0.25 in.) slot with a sample of about 20 cm×20 cm (8 in.×8 in.).

We claim:

1. Fibers comprising at least one copolymer of ethylene and at least one comonomer, the polymer having a density in the range of about 0.86 to about 0.93 g/cm³, a MWD in the range of about 1.8 to about 3.5, a melt index in the range of about 4 to about 1000, and a SDBI less than about 25° C.

2. Fibers of claim 1 wherein the comonomer comprises styrene, ethylenically unsaturated olefin(s) having from 3 to about 20 carbon atoms, or combinations thereof.

3. Fibers of claim 2 wherein the comonomer comprises one or more of propylene, butene-1, hexene-1, octene-1 and 4-methyl-1-pentene.

4. Fibers of claim 1 wherein the copolymer has a density in the range of about 0.86 to about 0.92 g/cm³.

5. Fibers of claim 1 wherein copolymer MWD is in the range of about 2.0 to about 2.5.

6. Fibers of claim 1 wherein the copolymer SDBI is less than about 20° C.

7. Fibers of claim 1 wherein the copolymer density is in the range of about 0.86 to about 0.89 g/cm³ and MWD is in the range of about 2 to about 2.2.

8. Fibers of claim 1 wherein the copolymer density is in the range of about 0.86 to about 0.91 g/cm³, the MWD is in the range of about 2 to about 3, and wherein the copolymer has;
   a) a melt index in the range of about 10 to about 1000 and is formed by a meltblown process,
   b) a melt index in the range of about 4 to about 60 and is formed by a spunbonded process, or
   c) a melt index in the range of about 4 to about 150 and is formed by a melt spinning process.

9. Fabrics comprising fiber(s) of claim 1 formed by melt blown process wherein copolymer melt index is in the range of about 10 to about 1000.

10. Fabrics comprising fibers of claim 1 and having,
   a) a permanent set, after 6 cycles of 50% extension in the machine direction, of less than about 25%;
   b) a permanent set, after 6 cycles of 50% extension in the transverse direction, of less than about 25%;
   c) a tensile modulus, after 6 cycles of 50% extension in the machine direction, of not more than about 300 g;
   d) a tensile modulus, after 6 cycles of 50% extension in the transverse direction, of not more than about 300 g; and
   e) a total hand of less than about 75 g.

11. Fabrics comprising fibers of claim 1 formed by spunbonded process wherein the copolymer melt index is in the range of about 4 to about 60.

12. Fabrics of claim 11 having,
   a) a permanent set, after 6 cycles of 100% extension in the machine direction, of less than about 40%;
   b) a permanent set, after 6 cycles of 100% extension in the transverse direction, of less than about 40%;
   c) a permanent set, after 6 cycles of 50% extension in the machine direction, of less than about 30%;
   d) a permanent set, after 6 cycles of 50% extension in the transverse direction, of less than about 35%;
   e) a tensile modulus, after 6 cycles of 100% extension in the machine direction, of less than about 900 g;
   f) a tensile modulus, after 6 cycles of 100% extension in the transverse direction, of less than about 600 g;
   g) a tensile modulus, after 6 cycles of 50% extension in the machine direction, of less than about 700 g;
   h) a tensile modulus, after 6 cycles of 50% extension in the transverse direction, of less than about 370 g; and
   i) a bonding temperature less than about 110° C.

13. Fabrics of claim 12 having,
   a) a permanent set, after 6 cycles of 100% extension in the machine direction, in the range of about 5--about 35%;
   b) a permanent set, after 6 cycles of 100% extension in the transverse direction, of less than about 5--about 35%;

c) a permanent set, after 6 cycles of 50% extension in the machine direction, in the range of about 5–about 25%;

d) a permanent set, after 6 cycles of 50% extension in the transverse direction, in the range of about 5–about 25%;

e) a tensile modulus, after 6 cycles of 100% extension in the machine direction, less than about 800 g;

f) a tensile modulus, after 6 cycles of 100% extension in the transverse direction, of less than about 500 g;

g) a tensile modulus, after 6 cycles of 50% extension in the machine direction, of less than about 600 g;

h) a tensile modulus, after 6 cycles of 50% extension in the transverse direction, in the range of about 40–about 200 g; and i) a bonding temperature in the range of about 35°–about 105° C.

14. Drapeable fabrics comprising fibers formed from copolymer(s) of ethylene and one or more comonomer(s), having a density in the range of about 0.86 to about 0.93 g/cm$^3$, a MWD in the range of about 2 to about 3.5, a melt index in the range of about 4 to about 1000, and a SDBI less than about 25° C.

15. Garment or drape comprising fabric of claim 14.

* * * * *